(No Model.)
S. VAN PATTEN.
GRAPPLING HOOK FOR BARRELS, &c.
No. 270,158. Patented Jan. 2, 1883.
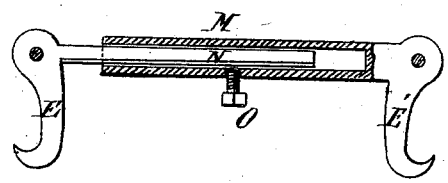
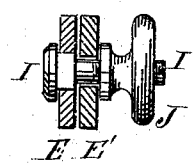
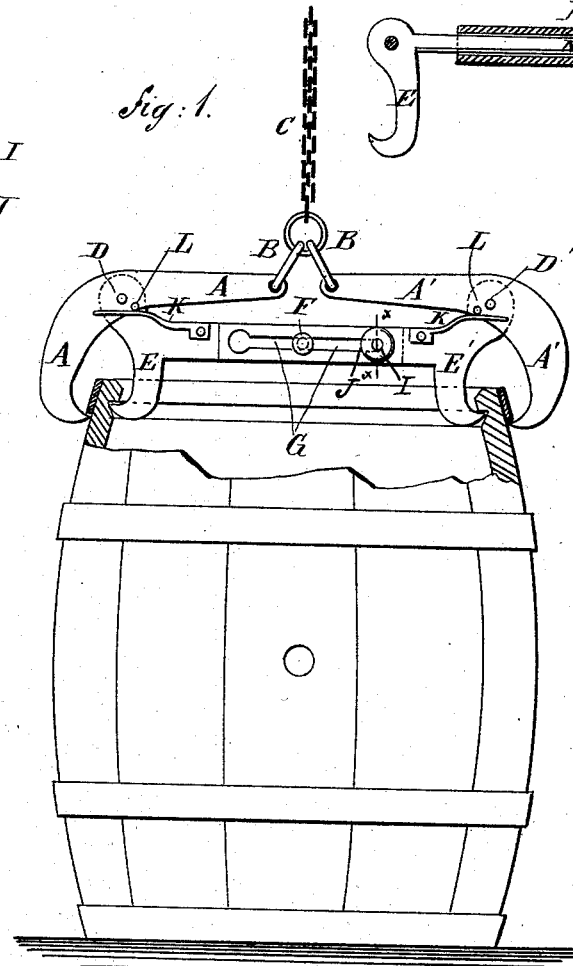
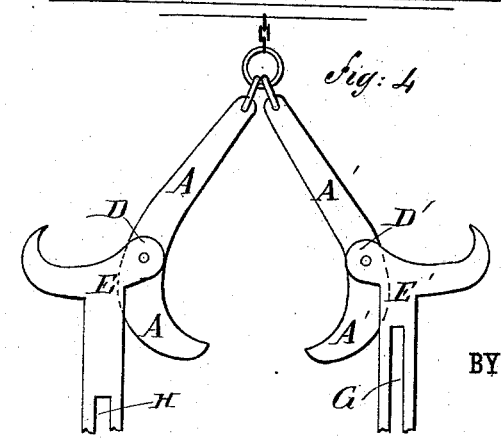
WITNESSES:
INVENTOR:
S. Van Patten
BY
ATTORNEYS.

UNITED STATES PATENT OFFICE.

SILAS VAN PATTEN, OF DUANESBURG, NEW YORK.

GRAPPLING-HOOK FOR BARRELS, &c.

SPECIFICATION forming part of Letters Patent No. 270,158, dated January 2, 1883.

Application filed September 30, 1882. (No model.)

*To all whom it may concern:*

Be it known that I, SILAS VAN PATTEN, of Duanesburg, in the county of Schenectady and State of New York, have invented certain new and useful Improvements in Grappling-Hooks for Barrels and other Packages, of which the following is a full, clear, and exact description.

Reference is to be had to the accompanying drawings, forming a part of this specification, in which similar letters of reference indicate corresponding parts in all the figures.

Figure 1 is a partly-sectional side elevation of my improvement, illustrating its use. Fig. 2 is a sectional elevation of a part of the same, taken through the line $x\ x$, Fig. 1. Fig. 3 is a sectional elevation of a part of the same, showing a modification. Fig. 4 is a side view of the improvement, shown as arranged for use as an ordinary grappling-hook.

The object of this invention is to facilitate the handling of barrels and other packages in raising them to or lowering them from a wagon or other elevation.

The invention consists in grappling-hooks constructed with two hooks having reversed hooks pivoted to them, the shanks of the said reversed hooks being secured to each other adjustably. The reversed hooks are made with pivotal arms, and their overlapping shanks are secured to each other adjustably by a headed pin and a clamping-bolt and nut, so that open barrels can be readily and safely raised and lowered. The grappling-hooks are kept in place upon the end of the barrel by springs attached to the reversed hooks and resting against stops upon the other hooks, as will be hereinafter fully described.

A A' are two hooks, the ends of the shanks of which are connected, by links B, rings, or other suitable means, with each other and with the hoisting rope or chain C.

To the middle parts of the hooks A A' are pivoted the ends of the arms D D', formed upon the reversed hooks E E'. The shanks of the hooks E E' overlap each other, and to one of the said shanks is attached a headed pin, F, which passes through a slot, G, in the shank of the other hook. The shank of the hook E, carrying the pin F, has a slot, H, formed in it, and extending from a point near the pin F nearly to the end of the said shank.

In the end of the shank of the hook E, carrying the pin F, is formed a square hole to receive the square body of a bolt, I, which passes through the slot G of the shank of the hook E', and has a nut, J, screwed upon its end to clamp the hooks E E' together, the pin F and bolt I keeping the shanks of the said hooks parallel.

In using the improvement the hooks E E' are adjusted with their points at such a distance apart as to enter the croze upon the opposite sides of a barrel, and are secured in place by tightening the nut J. Then by raising the shanks of the hooks A A' the points of the said hooks will engage with the end hoops or outside of the barrel, and the said barrel can be raised and lowered safely. To prevent the grappling-hooks from tipping over and becoming disengaged when the hoisting-rope is slack, I attach springs K to the shanks of the hooks E E', to rest against pins L or other stops attached to the hooks A A', as shown in Fig. 1.

If desired, the shank M of one of the hooks E E' can be made of tubular form to receive the shank N of the other hook, and the two shanks secured to each other adjustably by a set-screw, O, or other suitable means, as shown in Fig. 3.

When it is desired to handle bales of hay and other packages that do not have an edge for the pairs of hooks A E and A' E' to engage with, the shanks of the hooks E E' can be detached and the said hooks E E' turned back, so that the hooks A A' can be used as ordinary grappling-hooks, as shown in Fig. 4.

Having thus fully described my invention, I claim as new and desire to secure by Letters Patent—

1. Grappling-hooks constructed substantially as herein shown and described, and consisting of the hooks A A', having reversed hooks E E' pivoted to them, the shanks of the said reversed hooks being secured to each other adjustably, as set forth.

2. In grappling-hooks, the combination, with the hooks A A', of the reversed hooks E E', having pivotal arms D and slotted overlapping shanks secured to each other adjustably by a headed pin, F, and a clamping-bolt and nut, I J, substantially as herein shown and described, whereby open barrels can be readily and safely raised and lowered, as set forth.

3. In grappling-hooks, the combination, with the hooks A A' and E E', of the springs K and stops L, substantially as herein shown and described, whereby the said hooks will be kept in place when the hoisting rope or chain is slack, as set forth.

SILAS VAN PATTEN.

Witnesses:
EMMETT O'NEILL,
ETTEN SCHERMERHORN.